US009413740B2

(12) United States Patent
Rouatbi et al.

(10) Patent No.: US 9,413,740 B2
(45) Date of Patent: Aug. 9, 2016

(54) ESTABLISHING SECURE COMPUTING DEVICES FOR VIRTUALIZATION AND ADMINISTRATION (71) Applicant: Microsoft Technology Licensing, LLC, Redmond, WA (US)

(72) Inventors: Mohamed Rouatbi, Bellevue, WA (US); Karthik Jaganathan, Seattle, WA (US); Venkata K. Anumalasetty, Redmond, WA (US); Ramesh Chinta, Sammamish, WA (US); Scott A. Field, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 14/337,936

(22) Filed: Jul. 22, 2014

(65) Prior Publication Data

US 2016/0028704 A1    Jan. 28, 2016

(51) Int. Cl.
*G06F 21/00* (2013.01)
*H04L 29/06* (2006.01)
*G06F 21/31* (2013.01)

(52) U.S. Cl.
CPC ............... *H04L 63/08* (2013.01); *G06F 21/31* (2013.01); *H04L 63/0823* (2013.01); *H04L 63/10* (2013.01); *H04L 63/20* (2013.01)

(58) Field of Classification Search
CPC .................................. H04L 63/08; H04L 9/14
USPC .............. 726/1, 22, 23, 24, 25; 713/153, 155, 713/188
See application file for complete search history.

(56) References Cited

U.S. PATENT DOCUMENTS

| 8,407,804 B2* | 3/2013 | Todorovic ........................ 726/26 |
| 8,438,654 B1* | 5/2013 | von Eicken ............. G06F 21/53 709/217 |
| 2008/0256536 A1* | 10/2008 | Zhao et al. ........................ 718/1 |
| 2009/0125902 A1* | 5/2009 | Ghosh ................. G06F 9/45533 718/1 |
| 2013/0263209 A1 | 10/2013 | Panuganty et al. |

(Continued)

FOREIGN PATENT DOCUMENTS

WO    2014039772 A1    3/2014

OTHER PUBLICATIONS

"Application Whitelists in Virtual Organizations"—Huh et al, Oxford University, Jul. 2011 https://www.cs.ox.ac.uk/files/2696/application_whitelists_in_vos.pdf.*

(Continued)

*Primary Examiner* — Randy Scott
(74) *Attorney, Agent, or Firm* — Aneesh Mehta; Sade Fashokun; Micky Minhas (57) ABSTRACT Embodiments are directed to establishing a secure connection between computing systems and to providing computer system virtualization on a secure computing device. In one scenario, a computer system receives a request that at least one specified function be initiated. The request includes user credentials and a device claim that identifies the computing device. The computer system authenticates the user using the received user credentials and determines, based on the device claim, that the computing device is an approved computing device that has been approved to initiate performance of the specified function. Then, upon determining that the user has been authenticated and that the computing device is approved to initiate performance the specified function, the computer system initiates performance of the specified function.

20 Claims, 4 Drawing Sheets (56) References Cited

U.S. PATENT DOCUMENTS

2013/0263212 A1* 10/2013 Faltyn ................. H04W 12/08 726/1
2013/0269020 A1 10/2013 Griffin et al.
2014/0165177 A1* 6/2014 Alagha et al. ................. 726/9

OTHER PUBLICATIONS

Tripathi, et al. "Cloud Computing Security Considerations", In IEEE International Conference on Signal Processing, Communications and Computing, Sep. 14, 2011, 5 pages.

"Implementing Secure Administrative Hosts", Published on: Jul. 17, 2013, Available at: http://technet.microsoft.com/en-us/library/dn487449.aspx.

"Securing Active Directory Administrative Groups and Accounts", Published on: Mar. 1, 2011, Available at: http://technet.microsoft.com/en-us/library/cc875827.aspx.

"Panda Cloud Office Protection", Retrieved on: Apr. 21, 2014, Available at: http://www.prospettiva.co.uk/panda_office_protection.pdf.

Kumar, Ajay, "How Cloud Management Consoles Aid Enterprise Cloud Security Management", Published on: Feb. 25, 2013, Available at: http://searchcloudsecurity.techtarget.com/tip/How-cloud-management-consoles-aid-enterprise-cloud-security-management.

Melber, Derek, "Pass-The-Hash: Protect Your Windows Computers! (Part 1)", Published on: Jul. 31, 2013, Available at: http://www.windowsecurity.com/articles-tutorials/viruses_trojans_malware/pass-hash-protect-your-windows-computers-part1.html Melber, Derek, "Pass-The-Hash: Protect Your Windows Computers! (Part 2)", Published on: Nov. 27, 2013, Available at: http://www.windowsecurity.com/articles-tutorials/viruses_trojans_malware/pass-hash-protect-your-windows-computers-part2.html.

Carlos Perez, Juan, "Box Adds Security, Automation to IT Admin Console", Published on: Dec. 11, 2013, Available at: http://www.infoworld.com/d/cloud-computing/box-adds-security-automation-it-admin-console-232487.

Rains, Tim, "New Guidance to Mitigate Determined Adversaries' Favorite Attack: Pass-the-Hash", Published on: Dec. 11, 2012, Available at: http://blogs.technet.com/b/security/archive/2012/12/11/new-guidance-to-mitigate-determined-adversaries-favorite-attack-pass-the-hash.aspx.

"Microsoft IT Corporate sign in", Retrieved on: Apr. 28, 2014, Available at: https://microsoft.sharepoint.com/teams/IdentityCloudSecurity/Azure%20System%20Lockdown/Home.aspx.

"International Search Report & Written Opinion Issued in PCT Application No. PCT/US2015/041048", Mailed Date: Nov. 2, 2015, 12 pages.

* cited by examiner

ESTABLISHING SECURE COMPUTING DEVICES FOR VIRTUALIZATION AND ADMINISTRATION

BACKGROUND

Computing systems have become ubiquitous, ranging from small embedded devices to phones and tablets to PCs and backend servers. Each of these computing systems is designed to process software code. The software allows users to perform functions, interacting with the hardware provided by the computing system. In some cases, these computing systems allow users to establish and run virtual machines. These virtual machines may provide functionality not provided by the host operating system, or may comprise a different operating system altogether. In this manner, virtual machines may be used to extend the functionality of the computing system.

BRIEF SUMMARY

Embodiments described herein are directed to establishing a secure connection between computing systems and to providing computer system virtualization on a secure computing device. In one embodiment, a computer system receives a request that at least one specified function be initiated. The request includes user credentials and a device claim that identifies the computing device. The computer system authenticates the user using the received user credentials and determines, based on the device claim, that the computing device is an approved computing device that has been approved to initiate performance of the specified function. Then, upon determining that the user has been authenticated and that the computing device is approved to initiate performance the specified function, the computer system initiates performance of the specified function.

In another embodiment, a computer system performs a method for providing computer system virtualization on a secure computing device. The computer system establishes a secure computing device including: establishing a device claim that identifies the secure computing device, establishing an updating policy configured to ensure that the secure computing device is running up-to-date software patches, instantiating an application blocking "service" configured to ensure that only applications on a specified whitelist are allowed to be executed on the secure computing device and establishing a networking policy that prevents at least some inbound network connections from reaching the secure computing device. The computer system further instantiates a virtual machine on the established secure device, where the virtual machine allows at least one application to be executed that is not the specified whitelist.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to establishing a secure connection between computing systems and to providing computer system virtualization on a secure computing device. In one embodiment, a computer system receives a request that at least one specified function be initiated. The request includes user credentials and a device claim that identifies the computing device. The computer system authenticates the user using the received user credentials and determines, based on the device claim, that the computing device is an approved computing device that has been approved to initiate performance of the specified function. Then, upon determining that the user has been authenticated and that the computing device is approved to initiate performance the specified function, the computer system initiates performance of the specified function.

In another embodiment, a computer system performs a method for providing computer system virtualization on a secure computing device. The computer system establishes a secure computing device including: establishing a device claim that identifies the secure computing device, establishing an updating policy configured to ensure that the secure computing device is running up-to-date software patches, instantiating an application blocking "service" configured to ensure that only applications on a specified whitelist are allowed to be executed on the secure computing device and establishing a networking policy that prevents at least some inbound network connections from reaching the secure computing device. The computer system further instantiates a virtual machine on the established secure device, where the virtual machine allows at least one application to be executed that is not the specified whitelist.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
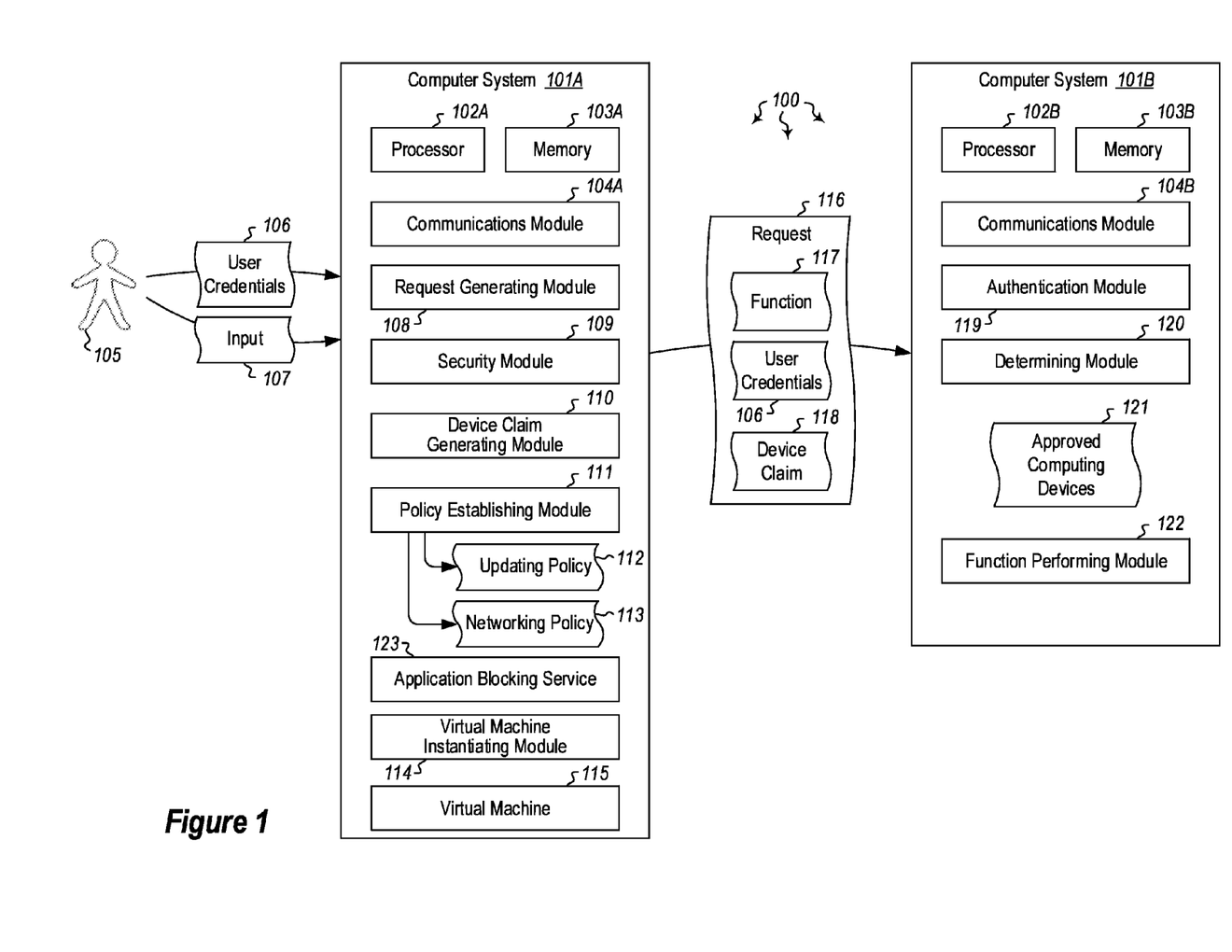
FIG. 1 illustrates a computer architecture in which embodiments described herein may operate including establishing a secure connection between computing systems.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer systems 101A and 101B. The computer systems 101A/101B may be any type of local or distributed computer systems, including cloud computing systems. Each computer system includes modules for performing different functions. For instance, the communications module 104A/104B may be configured to communicate with other computing systems. For instance, the communications module 104A of computer system 101A may be configured to communicate with the communications module 104B of computer system 101B, or with any other computing system. The communications modules 104A/104B may include any wired or wireless communication means that can receive and/or transmit data to or from other computing systems. The communications modules 104A/104B may be configured to interact with databases, mobile computing devices (such as mobile phones or tablets), embedded or other types of computing systems.

The computer system 101A further includes a request generating module 108. The request generating module 108 may be configured to generate request 116, which may include different items. The request itself may comprise a request that a certain function 117 be performed. For instance, the request 116 may comprise a request that an administrative action be performed such as adding or removing a virtual machine from a group of virtual machines that are providing a service. The request may specify the function 117 along with any other functions that are to be performed. The request may further include one or more user credentials 106 associated with a user. For example, user 105 may provide user credentials 106 to computer system 101A. The user credentials may be a user name and password, a token, biometric data such as a fingerprint or other type of credentials. These credentials may be passed to computer system 101B as part of the request 116 that a certain function be performed.

The request 116 may further include a device claim 118. The device claim, as the term is used herein, is any means of (uniquely) identifying the computer system 101A to another computer system. The device claim may be associated with or derived from hardware identifiers, or may be based on other information that can be used to positively identify the computer system 101A. As mentioned above, this computer system 101A may be any type of computing device and could be a phone, a wearable device, a tablet, an embedded system inside a car or appliance or any other type of computing system. The device claim generating module 110 of computer system 101A may generate the device claim which specifically identifies the computer system 101A. This device claim may be sent separately from the request 116, or may be sent as part of the request. The same is true for the user credentials 106.

The computer system 101B may receive the request 116 at the communications module 104B. The authentication module 119 may authenticate the user 105 using the received credentials 106. If the user's credentials are correct, the user 105 is authenticated to the computer system 101B. The determining module 120 of computer system 101B may determine whether the device (i.e. computer system 101A) is an approved computing device 121. In some embodiments, the computer system 101B may store an updateable list of computing systems that are authorized to perform certain functions. The determining module may look at the function 117 that is to be performed and the device claim 118 indicating which device is requesting the function. The list of approved computing devices 121 may indicate which computing devices and/or which users are approved to perform the requested function 117. If the authenticated user is approved to perform the function, and the device is on the approved computing devices list 121, and the function is one that the approved computing device is authorized to perform (or to request), then the computer system 101B will approve the received request and perform the function itself (e.g. using the function performing module 122) or allowing the function to be performed on another computing system (e.g. on the cloud or on computer system 101A).

Still further, embodiments are described herein which allow a computing system to be established as a secure computing system. A security module 109 may be implemented to ensure that various computing aspects that may lend themselves to vulnerabilities are locked down to prevent unauthorized or otherwise unapproved uses. For example, the policy establishing module 111 may be implemented to establish various policies including an updating policy 112 and a networking policy 113. The updating policy may indicate that the computing device (e.g. computer system 101A) is to continually check for software updates and apply those updates as they are received. The updating policy may take precautions to ensure that the updates are coming from expected places and in the expected manner. Updates may be digitally signed to ensure that the update provider is legitimate. The networking policy 113 may be implemented to ensure that most (or all) network ports are shut down and that most (or all) incoming network connections are denied. Indeed, the networking policy may be locked down to the extent desired by the administrator or system designer. The network may be configured to deny all but certain predetermined connections or requests, and may be similarly configured to prevent all or most outbound network connections. In this manner, data flowing in and out of the computing system may be highly regulated to prevent unauthorized connections.

An application blocking service 123 may also be instantiated on the device to ensure that it is secure. The application blocking service 123 may be configured as a whitelist that prevents any application not listed on the whitelist from running. This may include anything from high-level application code to low-level kernel code. The application blocking service 123 may be configured to observe each service and each function that is being executed and determine whether it is part of an approved application. In this manner, the computing device may be locked down to only execute those applications that have been approved. Further precautions may also be taken to establish a secure computing device such as limiting the execution of tasks to standard users, and limiting the functions that are allowed to be performed by internet browser applications on the device. These ideas will be explained further below, along with other embodiments described in methods 200 and 300 of FIGS. 2 and 3, respectively, herein below.

Figure 2:
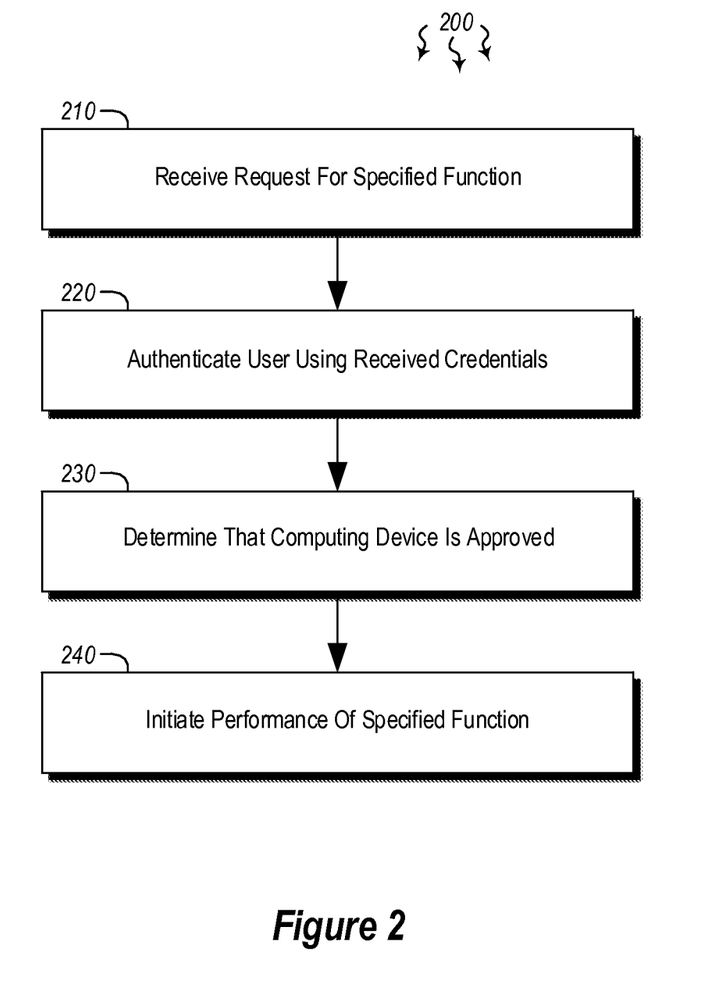
FIG. 2 illustrates a flowchart of an example method for establishing a secure connection between computing systems.
Figure 3:
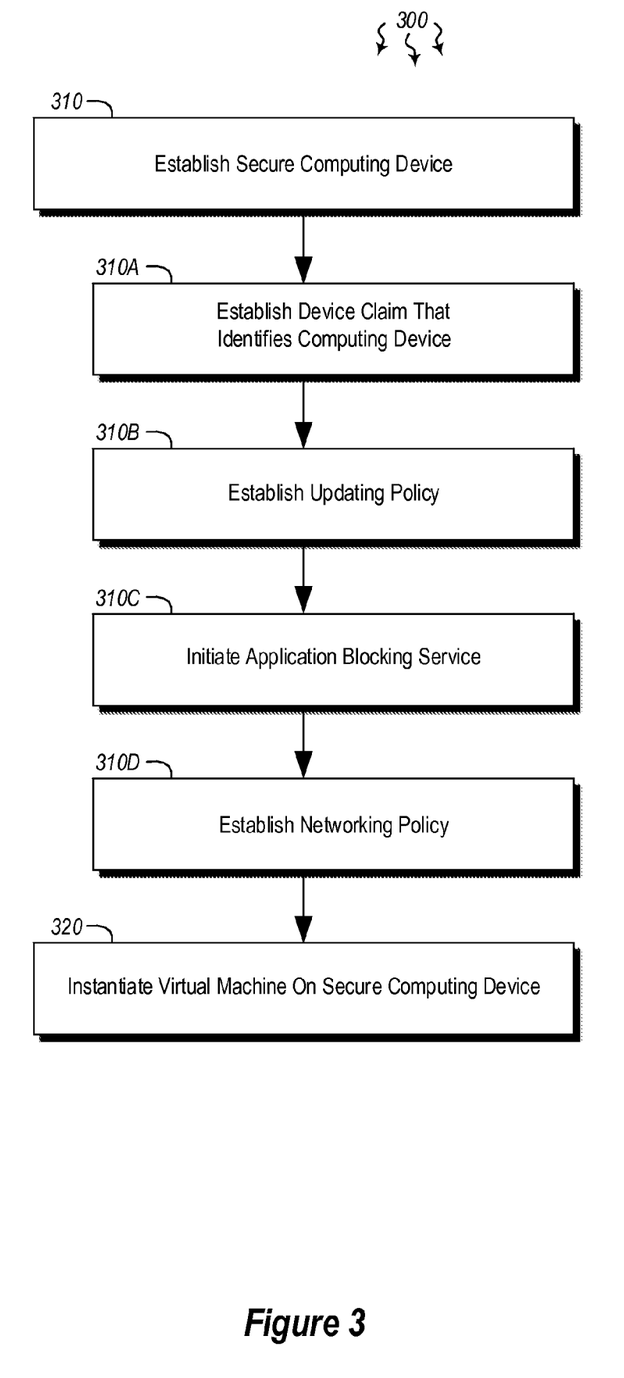
FIG. 3 illustrates a flowchart of an example method for providing computer system virtualization on a secure computing device.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for establishing a secure connection between computing systems. The method 200 will now be described with frequent reference to the components and data of environment 100.

Method 200 includes an act of receiving, from a computing device, a request that at least one specified function be initiated, the request including user credentials and a device claim that identifies the computing device (act 210). For example, the communications module 104B of computer system 101B may receive, from computer system 101A, a request 116 that specifies a function 117 that is to be initiated. The function may be performed by the function performing module 122 of computer system 101B or by another computer system or combination of computing systems. The request 116 may also include user credentials 106 provided by user 105, as well as a device claim 118 corresponding to the device (e.g. computer system 101A). The device claim may be generated by the device claim generating module 110 and may be generated based on or derived from any combination of hardware or other identifiers associated with the computer system 101. In some cases, the device claim may include a digital certificate corresponding to the computing device. The digital certificate uniquely identifies the computing device or certifies that the device claim is authentic and is associated with the computing system that sent to the request 116.

Method 200 further includes an act of authenticating the user using the received user credentials (act 220). The authentication module 119 of computer system 101B may access the user credentials 106 received in the request 116 and authenticate the user (or deny authentication) upon determining that the credentials are proper (or improper). The determining module 120 may then determine, based on the device claim 119, that the computing device (e.g. 101A) is an approved computing device that has been approved to initiate performance of the at least one specified function (act 230). Using the device claim 118 to positively identify the computer system 101A, the determining module may determine that the identified device is on a list of approved computing devices 121. This list may be updated over time, and may list different computing devices as being approved for certain tasks, or further, approved for certain tasks when requested by certain users. Thus, the approved computing devices list 121 may include different approved devices based on which function is requested, who requested the function and/or which device requested that the function be performed. As mentioned above, the specified function may be any type of computing function, and may include an administrative function, a cloud management task or any other function that may be performed by computer system 101B.

Method 200 includes, upon determining that the user has been authenticated and that the computing device is approved to initiate performance the at least one specified function, an act of initiating performance of the at least one specified function (act 240). Accordingly, once the determining module 120 determines that user 105 has been authenticated and that the computer system 101A is approved to initiate performance of the specified function 117, the function performing module 122 of computer system 101B may either perform the specified function or may initiate performance of the function, such that all or portions of the function are processed on other computer systems.

In some cases, determining that a computing device is an approved computing device that has been approved to initiate performance of a specified function includes determining that the computing device is a secure computing device or workstation. As used herein, a secure workstation is a computing system that is determined to be secure based on one or more factors. In some embodiments, establishing a secure workstation may include any or all of the following: establishing a device claim that identifies the secure workstation, establishing an updating policy configured to ensure that the secure workstation is running up-to-date software patches, instantiating an application blocking service configured to ensure that only applications on a specified whitelist are allowed to be executed on the secure workstation, and establishing a networking policy that prevents at least some inbound network connections from reaching the secure workstation. Other factors may additionally or alternatively be considered when determining whether a workstation is secure.

Figure 4:
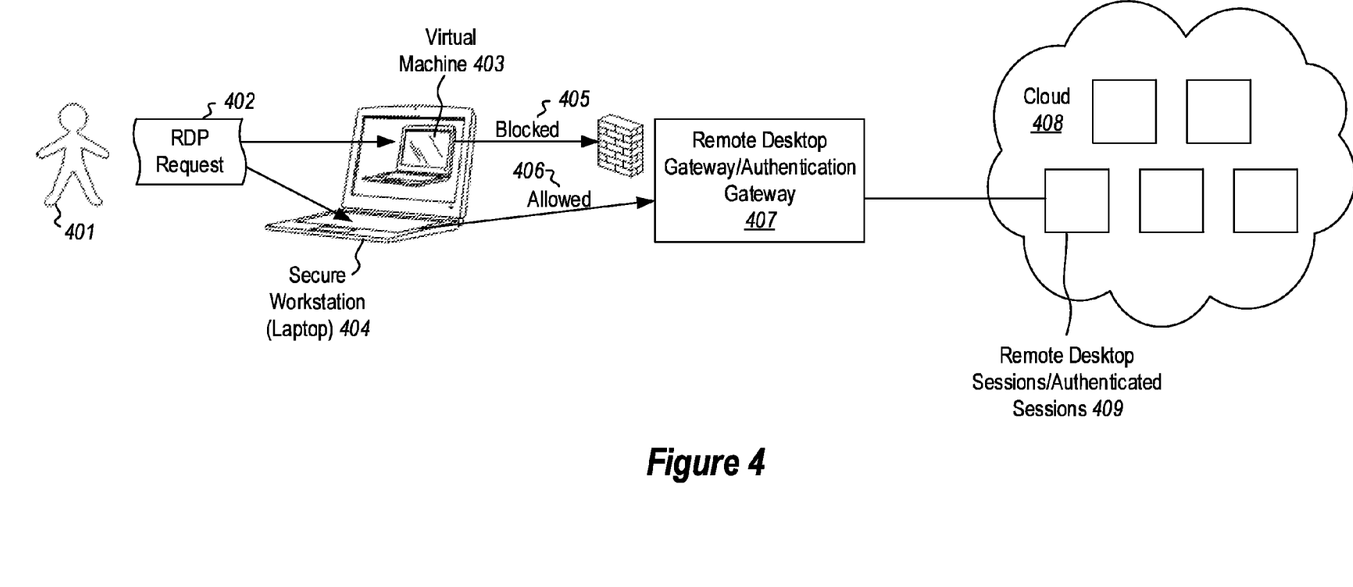
FIG. 4 illustrates a computing environment in which a secure remote desktop connection is established between computing systems.

In some embodiments, as generally shown in FIG. 4, the function to be performed as specified in the request 116 includes establishing a remote desktop session or other authenticated session to a computing system. Thus, user 401 may cause a remote desktop protocol (RDP) request 402 to be generated. In one scenario, the request is generated by a secure workstation 404 that has been determined to be secure, and in another scenario, the request 402 is generated by a virtual machine running on the secure workstation laptop 404 (while a laptop is shown, it will be understood that any type of computing system may be used). In the embodiment shown in FIG. 4, the remote desktop gateway/authentication gateway 407 may be configured to only allow requests from the secure workstation to be processed on the remote desktop sessions 409 (or other authenticated sessions) of the cloud 408. Thus, requests coming from a virtual machine 403 running on the secure workstation 404 would be blocked 405, as would requests from other non-secure workstations or virtual machines. Requests coming from the secure workstation 404, however, would be allowed 406, and the user 401 would be able to establish a remote desktop session 409 and perform administrative tasks for a cloud service or perform other functions as generally allowed by policy or by the user's rights.

The secure workstation 404 may be shared between multiple different computing device users, including and in addition to user 401. The secure workstation may be configured such that any user that logs in can only perform functions associated with a standard user, and not those of an administrative user. As such, multiple different users may be able to use the secure workstation to perform tasks such as logging in to a remote desktop session where they may then log in as administrators (to the remote machine) and perform administrative tasks. Still further, the secure workstation 404 may be one of a plurality of approved computing devices that are approved to perform a specified function. Thus, in such cases, if a request comes in to perform a specified function, the remote desktop gateway/authentication gateway 407 may determine that the secure workstation 404 is one of a list of approved computing devices and may allow the incoming request. Policies may be established to indicate which combinations of authenticated user and approved computing device are permitted to perform any given function so that a high level of granularity is available when denying or allowing requests from certain users and/or devices.

Policies may further indicate which applications are allowed to generate requests and have those requests processed. In one embodiment, the computer system 101B of FIG. 1 receives, from computer system 101A, an application identity that identifies an application running thereon. The determining module 120 determines that the application identity identifies at least one approved application, and further includes the application identity determination in the determination to initiate performance of the at least one specified function. Accordingly, when determining whether to allow or deny a request that a specified function be performed, the determining module 120 may look at which user sent the request, which computing device the request was received from, which function is to be performed, and, if applicable, which application was involved in generating the request. The determining module 120 may look at any combination of the above when determining whether to allow or deny any given request. Thus, in this manner, a computing system such as 101B may have great discretion over which users, devices and/or applications are permitted to request performance of each function 117.

Turning now to FIG. 3, a flowchart is illustrated of a method 300 for providing computer system virtualization on a secure computing device. The method 300 will now be described with frequent reference to the components and data of environment 100.

Method 300 includes an act of establishing a secure computing device (310) which includes an act of establishing a device claim that identifies the secure computing device (act 310A), an act of establishing an updating policy configured to ensure that the secure computing device is running up-to-date software patches (act 310B), an act of instantiating an application blocking service configured to ensure that only applications on a specified whitelist are allowed to be executed on the secure computing device (act 310C), and an act of establishing a networking policy that prevents at least some inbound network connections from reaching the secure computing device (act 310D). Method 300 further includes an act of instantiating at least one virtual machine on the established secure device, the instantiated virtual machine allowing at least one application to be executed that is not the specified whitelist (act 320).

Thus, as shown in FIG. 4, a secure workstation 404 may be established (using 310A-310D) and a virtual machine 403 may be instantiated on the secure workstation. Then, even though the secure workstation is prevented from receiving most or all inbound network connections, the virtual machine 403 may receive such network connections. Similarly, even though the secure workstation is running an application blocking service that prevents non-whitelisted applications from running on the secure workstation, applications outside the whitelist may be run on the virtual machine. Indeed, because the virtual machine is walled off from the secure workstation, the user may perform a large number of functions that would not be allowed on the secure workstation. As such, the virtual machine 403 may provide a personal workspace for user 401 on the secure computing device. The secure workstation remains secure, and the user can go about their normal activities within the virtual machine.

In cases where multiple different users have accounts on the secure workstation, multiple different virtual machines may be instantiated (simultaneously or at different times) to accommodate the different users. In some embodiments, a hardware feedback loop may be established to optimize hardware usage between the various personal workspaces. Each user may be able to perform functions such as opening a remote desktop application within the virtual machine. In the scenario of FIG. 4, however, the RDP request 402 from the virtual machine would be denied since it is not coming from a secure workstation (i.e. not directly from the secure workstation 404).

Establishing a secure workstation may include many different options in addition to or in the alternative to those listed above. Indeed, establishing a secure computing device may further include establishing a policy that prevents users from performing functions with administrative rights on the secure computing device. In such cases, users logged in to the secure workstation 404 may be limited to performing actions as a standard user or other user that has fewer rights than the full suite of administrative rights. Establishing a secure computing device may also include establishing an antivirus policy which ensures that the computing device is running an antivirus application or establishing an internet browser policy which limits the functions that are allowed to be performed by the internet browser. Such policies may be applied to other applications besides an internet browser application, so that those applications are also limited in the functions they can perform while running on the secure workstation 404.

Accordingly, methods, systems and computer program products are provided which establishes a secure connection between computing systems. Moreover, methods, systems and computer program products are provided which provide computer system virtualization on a secure computing device.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. At a computer system including at least one processor, a computer-implemented method for providing computer system virtualization on a secure computing device, the method comprising:
  an act of establishing a secure computing device including:
    establishing a device claim that identifies the secure computing device; establishing an updating policy configured to ensure that the secure computing device is running up-to-date software patches; instantiating an application blocking service configured to ensure that only applications on a specified whitelist are allowed to be executed on the secure computing device; and establishing a networking policy that prevents at least some inbound network connections from reaching the secure computing device; and an act of instantiating at least one virtual machine on the established secure device, the instantiated at least one virtual machine allowing at least one application to be executed that is not the specified whitelist.

2. The method of claim 1, wherein the instantiated at least one virtual machine receives one or more inbound network connections not permitted by the established networking policy for the secure computing device.

3. The method of claim 1, wherein the at least one virtual machine provides a personal workspace for a user on the secure computing device.

4. The method of claim 3, wherein a hardware feedback loop is established to optimize hardware usage between personal workspaces.

5. The method of claim 1, wherein the act of establishing the secure computing device further comprises establishing a policy that prevents users from performing functions with administrative rights on the secure computing device.

6. The method of claim 1, wherein the act of establishing the secure computing device further comprises establishing an antivirus policy which ensures that the computing device is running an antivirus application.

7. The method of claim 1, wherein the act of establishing the secure computing device further comprises establishing an internet browser policy which limits the functions that are allowed to be performed by the internet browser.

8. The method of claim 1, wherein the instantiated virtual machine on the established secure device allows instantiation of a remote desktop application.

9. A computer system, comprising:
one or more processors; system memory; and one or more computer-readable media having stored thereon computer-executable instructions that are executable by the one or more processors, and that configure the computer system to provide computer system virtualization on a secure computing device, including computer-executable instructions that configure the computer system to perform at least the following:
establish a secure computing device including:
establishing a device claim that identifies the secure computing device; establishing an updating policy configured to ensure that the secure computing device is running up-to-date software patches; instantiating an application blocking service configured to ensure that only applications on a specified whitelist are allowed to be executed on the secure computing device; and establishing a networking policy that prevents at least some inbound network connections from reaching the secure computing device; and instantiate at least one virtual machine on the established secure device, the instantiated virtual machine being configured to allow at least one application to be executed that is not the specified whitelist.

10. The computer system of claim 9, wherein the at least one virtual machine is also configured to receive one or more inbound network connections not permitted by the established networking policy for the secure computing device.

11. The computer system of claim 9, wherein the at least one virtual machine is also configured to provide a personal workspace for a user on the secure computing device.

12. The computer system of claim 11, also including computer-executable instructions that configure the computer system to establish a hardware feedback loop to optimize hardware usage between personal workspaces.

13. The computer system of claim 9, also including computer-executable instructions that configure the computer system to, as part of establishing the secure computing device, establish a policy that prevents users from performing functions with administrative rights on the secure computing device.

14. The computer system of claim 9, also including computer-executable instructions that configure the computer system to, as part of establishing the secure computing device, establish an antivirus policy which ensures that the computing device is running an antivirus application.

15. The computer system of claim 9, also including computer-executable instructions that configure the computer system to, as part of establishing the secure computing device, establish an internet browser policy which limits the functions that are allowed to be performed by the internet browser.

16. The computer system of claim 9, wherein the at least one virtual machine is also configured to allow instantiation of a remote desktop application.

17. A computer program product comprising one or more hardware storage devices having stored thereon computer-executable instructions that are executable by the one or more processors, and that configure the computer system to provide computer system virtualization on a secure computing device, including computer-executable instructions that configure the computer system to perform at least the following:
establish a secure computing device including:
establishing a device claim that identifies the secure computing device; establishing an updating policy configured to ensure that the secure computing device is running up-to-date software patches; instantiating an application blocking service configured to ensure that only applications on a specified whitelist are allowed to be executed on the secure computing device; and establishing a networking policy that prevents at least some inbound network connections from reaching the secure computing device; and instantiate at least one virtual machine on the established secure device, the instantiated virtual machine being configured to allow at least one application to be executed that is not the specified whitelist.

18. The computer program product of claim 17, wherein the at least one virtual machine is also configured to receive one or more inbound network connections not permitted by the established networking policy for the secure computing device.

19. The computer program product of claim 17, wherein the at least one virtual machine is also configured to provide a personal workspace for a user on the secure computing device.

20. The computer program product of claim 17, also including computer-executable instructions that configure the computer system to, as part of establishing the secure computing device, perform one or more of the group comprising: (i) establish a policy that prevents users from performing functions with administrative rights on the secure computing device, (ii) establish an antivirus policy which ensures that the computing device is running an antivirus application, and (iii) establish an internet browser policy which limits the functions that are allowed to be performed by the internet browser.

* * * * *